US008325353B2

(12) United States Patent
Shimmoto

(10) Patent No.: US 8,325,353 B2
(45) Date of Patent: Dec. 4, 2012

(54) IMAGE PROCESSING APPARATUS THAT DETERMINES WHETHER A USER INSTRUCTION FOR PERFORMING IMAGE PROCESSING FUNCTIONS INVOKES ONE OR MULTIPLE IMAGE PROCESSING COMMON SERVICES

(75) Inventor: Takafumi Shimmoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1194 days.

(21) Appl. No.: 11/802,478

(22) Filed: May 23, 2007

(65) Prior Publication Data

US 2007/0288284 A1 Dec. 13, 2007

(30) Foreign Application Priority Data

Jun. 8, 2006 (JP) ................... 2006-159847

(51) Int. Cl.
*G05B 19/418* (2006.01)
(52) U.S. Cl. ......... 358/1.13; 358/1.9; 358/1.15; 399/75; 399/85; 710/8; 710/14
(58) Field of Classification Search ............ 358/1.9, 358/1.13, 1.15; 399/75, 85; 710/8, 14
See application file for complete search history.

(56) References Cited

U.S. PATENT DOCUMENTS

| 7,522,296 | B2 | 4/2009 | Ozawa et al. | |
|---|---|---|---|---|
| 2004/0190034 | A1* | 9/2004 | Ozawa et al. | 358/1.13 |
| 2004/1900034 | | 9/2004 | Ozawa et al. | |

FOREIGN PATENT DOCUMENTS

| CN | 1533149 A | 9/2004 |
|---|---|---|
| JP | 09-224137 | 8/1997 |
| JP | 2002-082806 | 3/2002 |
| JP | 2002-084383 | 3/2002 |
| JP | 2004-258214 | 9/2004 |
| JP | 2005-287042 | 10/2005 |
| JP | 2005-304016 | 10/2005 |

OTHER PUBLICATIONS

Chinese Office Action dated Feb. 6, 2009 for counterpart Chinese Application No. 200710189455 and English translation thereof.
Chinese Office Action dated Jul. 17, 2009corresponding to Chinese Application No. 2007101089455 and English translation thereof.
English translation of Office Action for corresponding Japanese patent application No. 2006-159847 dated Mar. 29, 2011.

* cited by examiner

*Primary Examiner* — Thomas Lett
*Assistant Examiner* — Peter K Huntsinger
(74) *Attorney, Agent, or Firm* — Harness, Dickey & Pierce, P.L.C.

(57) ABSTRACT

An image processing apparatus is installed with service software for controlling settings of a plurality of devices that performs functions related to image processing. The image processing apparatus is also installed with an application that issues instruction information indicating an instruction related to at least one of the functions. The image processing apparatus includes a specifying unit that specifies service software corresponding to the instruction based on the instruction information and specifies setting information to be set for the service software, and a sending unit that sends the setting information to the service software specified by the specifying unit.

18 Claims, 7 Drawing Sheets

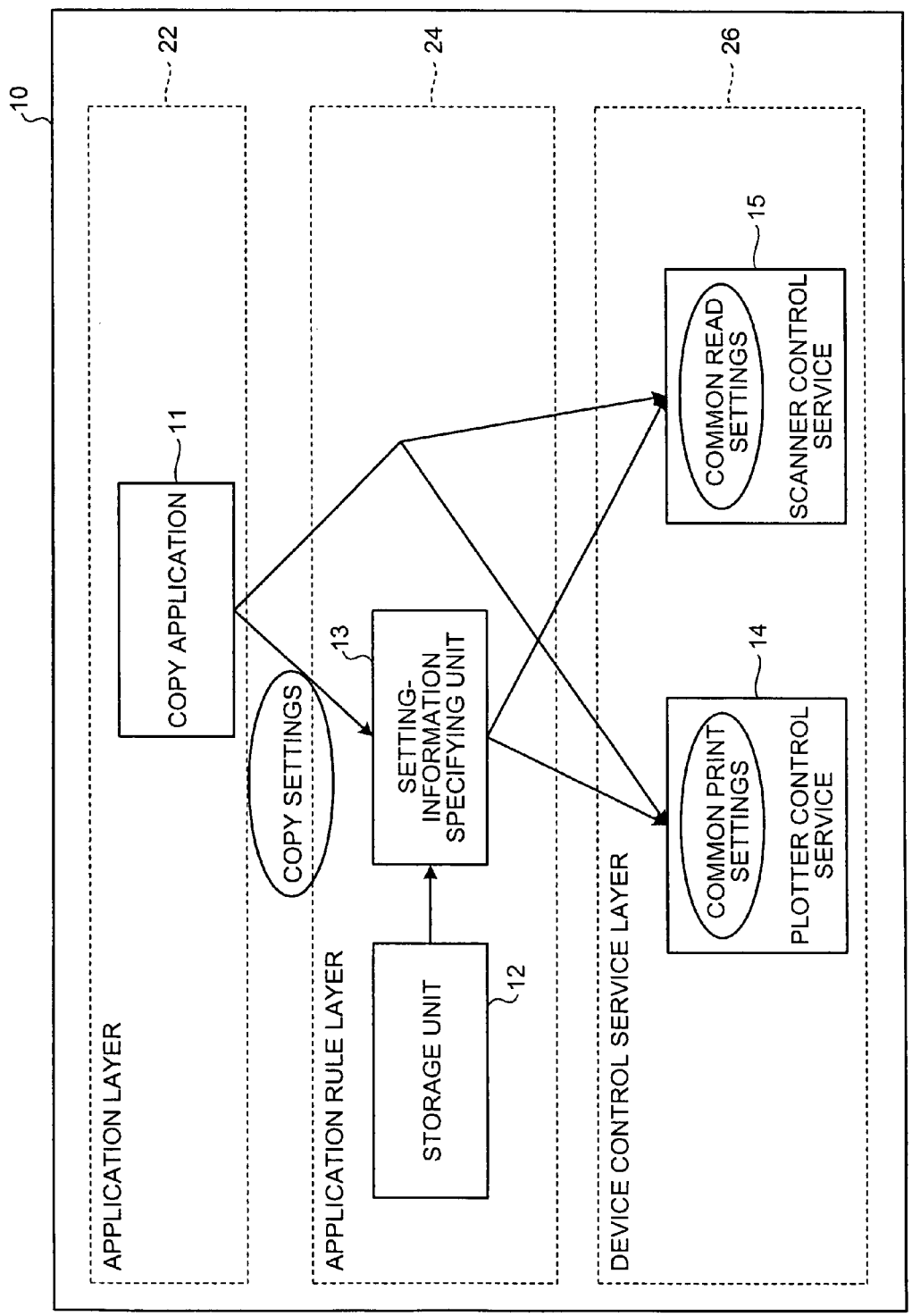

FIG.2

| COPY SETTINGS | READ SETTINGS | PRINT SETTINGS |
|---|---|---|
| SPEED PRIORITY | AUTOMATIC SCALING | SPECIFICATION TRAY |
| FULL-COLOR | FULL-COLOR READING | FULL-COLOR PRINTING |
| MONOCHROME | MONOCHROME READING | MONOCHROME PRINTING |
| TWO COLORS | FULL-COLOR READING | TWO-COLOR CONVERSION PRINTING |
| SINGLE COLOR | FULL-COLOR READING | SINGLE COLOR CONVERSION PRINTING |
| AUTOMATIC PAPER SELECTION | AUTOMATIC ORGINAL SIZE DETECTION | AUTOMATIC TRAY SELECTION |
| AUTOMATIC COLOR SELECTION | AUTOMATIC ORGINAL COLOR RECOGNITION | AUTOMATIC COLOR SELECTION |

IMAGE PROCESSING APPARATUS THAT DETERMINES WHETHER A USER INSTRUCTION FOR PERFORMING IMAGE PROCESSING FUNCTIONS INVOKES ONE OR MULTIPLE IMAGE PROCESSING COMMON SERVICES

CROSS-REFERENCE TO RELATED APPLICATIONS

The present document incorporates by reference the entire contents of Japanese priority document, 2006-159847 filed in Japan on Jun. 8, 2006.

BACKGROUND OF THE INVENTION

1. Field of the Invention

The present invention relates to an image processing apparatus, an information processing apparatus, an image processing method, an information processing method, and a computer program product.

2. Description of the Related Art

An apparatus that efficiently uses software programs (applications) supporting copiers, printers, facsimile machines, and others, and also increases productivity as the entire apparatus has been known. For example, Japanese Patent Application Laid-Open Nos. 2005-287042 and 2005-304016 each disclose an apparatus in which common portions of the applications are extracted as a common system service, this common system service and a general-purpose operating system (OS) form a platform, and a copy application, a printer application, a facsimile application, and others are installed on this platform.

In this manner, applications and common services for common use among the applications are separated to reuse service software over a plurality of models, which achieves an increase in efficiency of application development. Furthermore, with service software being repeatedly used over a plurality of models, the internal structure of software becomes sophisticated. Therefore, an increase in quality can be advantageously expected.

However, there is a problem newly occurring with the structure in which applications and common services are separated as explained above.

FIG. 6 is a schematic diagram of a conventional information processing apparatus 100 with a structure in which applications and common services are separated from each other. A plotter control service 110 and a scanner control service 112 shown in FIG. 6 are software programs providing services common to a plurality of applications (a printer application 102, a copy application 104, and a scanner application 106) such as data printing and reading. Each application has to set appropriate parameters for each service when requesting reading or printing. As shown in FIG. 6, the scanner control service 112 has set therein parameters, i.e., read settings, required for reading according to each application, including copy read settings, FAX read settings, and scanner read settings. The same is applied to print settings of the plotter control service 110. The scanner control service 112 and the plotter control service 110 specified by an application derives setting values according to the application for actual processing.

When an appropriate parameter in a certain application is modified, the common services for use by this application, that is, the scanner control service 112 and the plotter control service 110, have to be modified. This is highly likely to affect another application that depends on the common services for use by the certain application. For example, when a parameter associated with printing for the copy application 104 is corrected, the plotter control service 110 has to be corrected. As a result, this is highly likely to affect printing for the printer application 102.

In this manner, with each application and common service having a close dependence on one another, software not originally requiring modification has to be modified. In this state, quality as software is low.

To get around this problem, a configuration may be proposed in which each common service receives specific parameters. FIG. 7 is examples of parameters in this case. The scanner control service 112 has set therein specific parameters, such as read resolution and read range, as read settings in place of parameters set according to each application. The same is applied to print settings of the plotter control service 110.

However, the user does not always specify all such parameters, and it is substantially impossible for the user to ascertain appropriate setting parameters for executing the application.

SUMMARY OF THE INVENTION

It is an object of the present invention to at least partially solve the problems in the conventional technology.

According to an aspect of the present invention, an image processing apparatus includes a service storage unit that stores therein a plurality of services for controlling settings of a plurality of devices that performs functions related to image processing, an application storage unit that stores therein an application that issues instruction information indicating an instruction related to at least one of the functions, a specifying unit that specifies a service corresponding to the instruction based on the instruction information and specifies setting information to be set for the service, and a sending unit that sends the setting information to the service specified by the specifying unit.

According to another aspect of the present invention, an information processing apparatus includes a service storage unit that stores therein a plurality of services for controlling settings of a plurality of devices that performs functions related to predetermined processing, an application storage unit that stores therein an application that issues instruction information indicating an instruction related to at least one of the functions, a specifying unit that specifies a service corresponding to the instruction based on the instruction information and specifies setting information to be set for the service, and a sending unit that sends the setting information to the service specified by the specifying unit.

According to still another aspect of the present invention, an image processing method includes issuing instruction information indicating an instruction related to at least one function, specifying, based on the instruction information, a service corresponding to the instruction from a plurality of services for controlling settings of a plurality of devices that performs functions related to image processing, specifying setting information to be set for specified service, and sending the setting information to the service specified by the specifying unit.

According to still another aspect of the present invention, an information processing method includes issuing instruction information indicating an instruction related to at least one function, specifying, based on the instruction information, a service corresponding to the instruction from a plurality of services for controlling settings of a plurality of devices that performs functions related to image processing, specifying setting information to be set for specified service, and sending the setting information to the service specified by the specifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an image processing apparatus according to an embodiment of the present invention;

FIG. 2 is an example of data stored in a storage unit shown in FIG. 1;

DETAILED DESCRIPTION OF THE PREFERRED EMBODIMENTS

Figure 3:
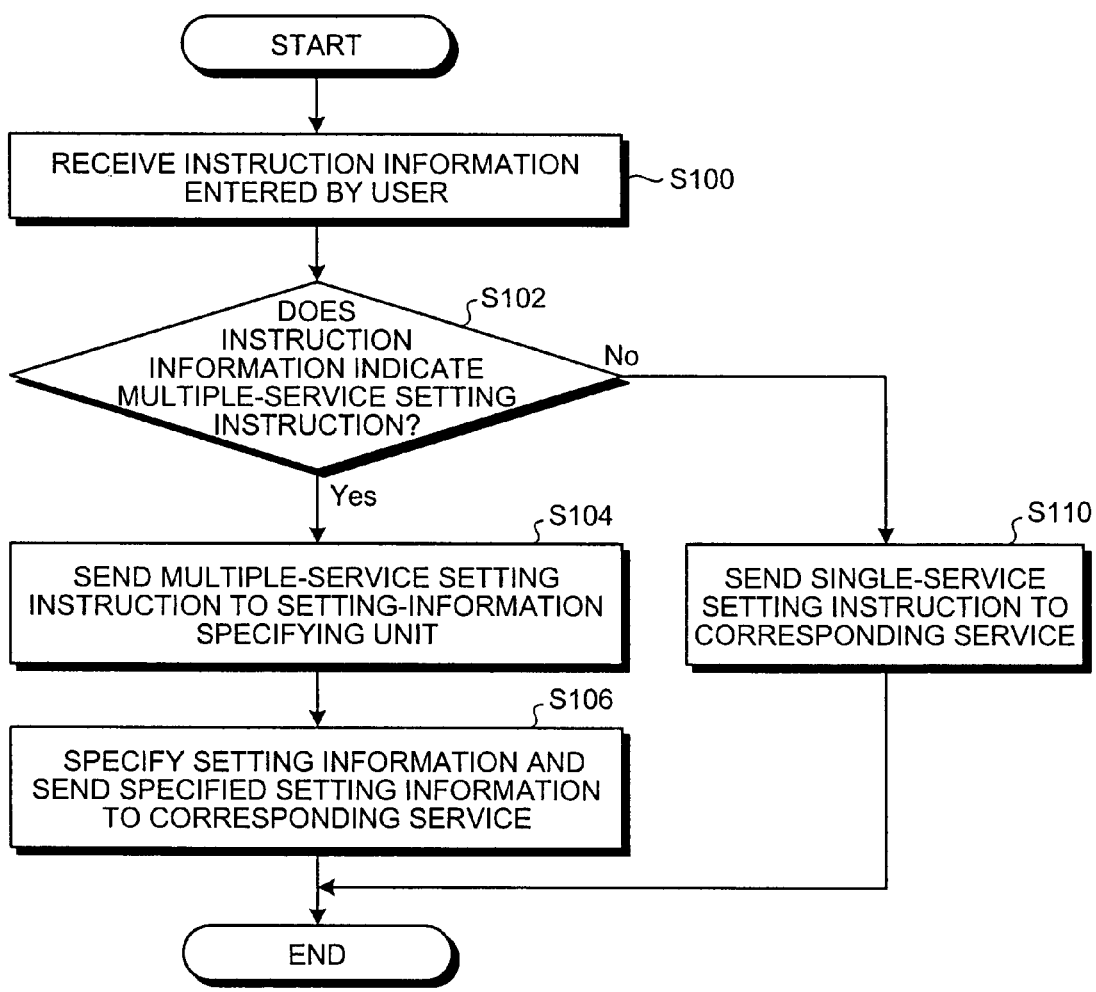
FIG. 3 is a flowchart of a service control process performed by the image processing apparatus.

Exemplary embodiments of the present invention are explained below in detail with reference to the accompanying drawings.

FIG. 1 is a block diagram of an image processing apparatus 10 according to an embodiment of the present invention. The image processing apparatus 10 is installed with a copy application 11, and includes a storage unit 12, and a setting-information specifying unit 13. The image processing apparatus 10 is also installed with a plotter control service 14 and a scanner control service 15, which are common services used by a plurality of applications.

The plotter control service 14 is software that provides a data printing function and controls a printing function. The scanner control service 15 is software that provides a data reading function and controls the reading function.

The copy application 11 receives an input from a user. Then, according to the input from the user, instruction information is transmitted to the plotter control service 14, the scanner control service 15, or the setting-information specifying unit 13. Here, the instruction information is information indicating an instruction for one or two or more common services, specifically, information indicating an instruction for full-color print or monochrome print, for example.

The copy application 11 receives instruction information entered by the user. The instruction information is information indicating an instruction for one or two or more common services, specifically, information indicating an instruction for full-color print or monochrome print, for example.

Then, whether the instruction information is a multiple-service setting instruction or a single-service setting instruction is checked. Specifically, a table is retained in which instruction information that can be entered from the user and information indicating whether the instruction information is a multiple-service setting instruction or a single-service setting instruction are associated with each other, and the check is performed based on this table.

The multiple-service setting instruction indicates, for example, full color processing. In this case, the multiple-service setting instruction instructs the scanner control service 15 to perform full-color reading and the plotter control service 14 to perform full-color printing. That is, the multiple-service setting instruction is an instruction for a plurality of common services.

The instruction indicates, for example, a document type to the scanner. In this case, the single-service setting instruction specifies a document type for the scanner control service 15. That is, the single-service setting instruction is an instruction for one common service.

When the instruction information indicates a multiple-service setting instruction, this instruction is sent to the setting-information specifying unit 13. When the instruction information indicates a single-service setting instruction, this instruction is sent to a directly-corresponding common service (the plotter control service 14, the scanner control service 15).

The storage unit 12 stores therein setting information. The setting information indicates settings to be set for each common service. For example, setting information to be set to the scanner control service 15 includes full-color reading. The setting-information specifying unit 13 refers to the storage unit 12 to specify setting information of each common service corresponding to the multiple-service setting instruction obtained from the copy application 11. Then, the specified setting information is sent to a corresponding common service (the plotter control service 14, the scanner control service 15).

In this manner, in the image processing apparatus 10 according to the present embodiment, an application rule layer 24 to which the storage unit 12 and the setting-information specifying unit 13 belong is provided between the copy application 11 belonging to an application layer 22 and the plotter control service 14 and the scanner control service 15 belonging to a device control service layer 26.

FIG. 2 is an example of data stored in the storage unit 12. As shown in FIG. 2. multiple-service setting instructions are associated with setting information for each common service. For example, a multiple-service setting instruction "speed priority" is associated with setting information for the plotter control service 14, i.e., "tray specification" as a print setting, and is also associated with setting information for the scanner control service 15, i.e., "automatic scaling" as a read setting. The setting-information specifying unit 13 specifies setting information associated with the instruction information obtained from the copy application 11 in the storage unit 12.

FIG. 3 is a flowchart of a service control process performed by the image processing apparatus 10. First, the copy application 11 receives instruction information entered by the user (step S100). Next, it is checked whether the instruction information indicates a multiple-service setting instruction or a single-service setting instruction. If the instruction information indicates a multiple-service setting instruction (Yes at step S102), the copy application 11 sends the multiple-service setting instruction to the setting-information specifying unit 13 (step S104). The setting-information specifying unit 13 specifies setting information for each common service associated with the multiple-service setting instruction obtained from the copy application 11. Then, the specified setting information is sent to a corresponding common service (the plotter control service 14, the scanner control service 15) (step S106).

Specifically, when obtaining a full-color instruction as a multiple-service setting instruction, the setting-information specifying unit 13 specifies full-color reading associated with full-color instruction in the storage unit 12 as setting information for the scanner control service 15. Similarly, the setting-information specifying unit 13 specifies full-color printing associated with full-color instruction in the storage unit 12 as setting information for the plotter control service 14.

In this manner, when an instruction covering a plurality of services is received, the setting-information specifying unit 13 provided in the application rule layer 24 can send the setting information for each common service associated with the multiple-service setting instruction to each common service. With this, a relation between each application and service is loosened, thereby increasing maintainability and reusability of the entire system.

On the other hand, when the instruction information entered by the user indicates a single-service setting instruction (No at step S102), the copy application 11 sends this single-service setting instruction to a corresponding common service (step S110).

Specifically, when a document type is set as a single-service setting instruction, an instruction for setting the document type is sent to the scanner control service 15. Also, when the number of prints is set as a single-service setting instruction, an instruction for setting the number of prints is sent to the setting-information specifying unit 13. With this, the service control process performed by the image processing apparatus 10 is completed.

Figure 4:
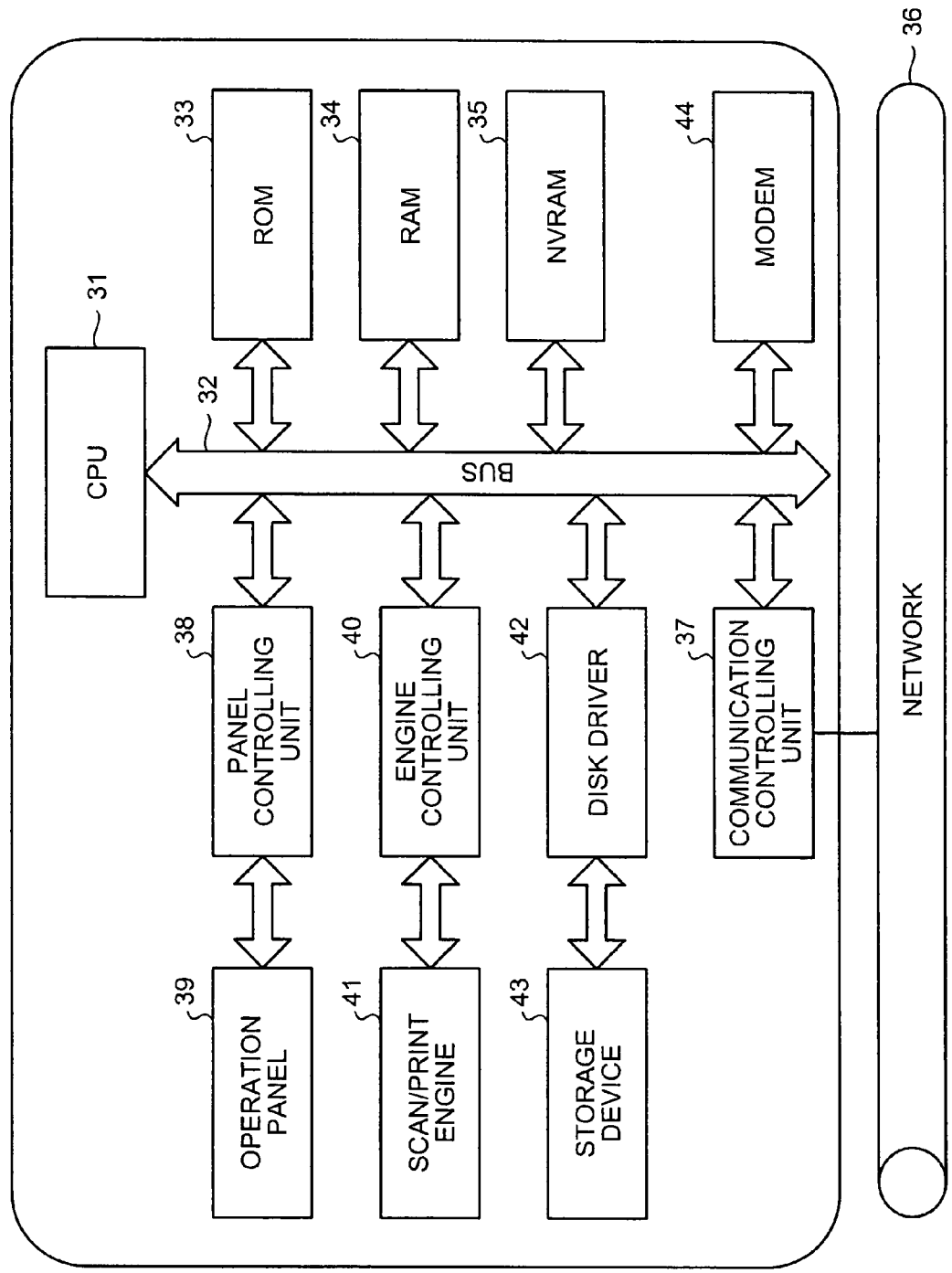
FIG. 4 is a block diagram of a hardware configuration of the image processing apparatus.

FIG. 4 is a block diagram of a hardware configuration of the image processing apparatus 10. The image processing apparatus 10 includes, as a hardware configuration, a Central Processing Unit (CPU) 31 that controls each component as a main body of a microcomputer. The CPU 31 is connected-via a bus 32 to a Read-Only Memory (ROM) 33 that previously stores therein predetermined data or a computer program (hereinafter, "service control program") for the service control process, a Random Access Memory (RAM) 34 that rewritably stores therein various data, and Non-Volatile RAM (NVRAM) 35 that stores therein data without being lost.

The bus 32 is also connected to a communication controlling unit 37 for communication with a network 36, an operation panel 39 having an Liquid Crystal Display (LCD) touch panel serving as an interface with a user via a panel controlling unit 38, a scan/print engine 41 that causes a scanner unit and a printer unit to input or output image data (reading of a paper document and printing to a transfer paper sheet) via an engine controlling unit 40, a storage device 43, which is a Hard Disk Drive (HDD) for use in storage and accumulation of image data, control programs, and other via a disk driver 42, and a modem 44 allowing data communication with external devices via a public line.

The service control program can be provided as being recorded on a computer-readable recording medium, such as a Compact Disk Read-Only Memory (CD-ROM), a floppy disk (registered trademark) (FD), or a Digital Versatile Disk (DVD), as a file in an installable format or executable format.

In this case, the service control program is loaded from such a recording medium into a main storage device in the image processing apparatus 10 for execution, and each component explained above is implemented on the main storage device.

The service control program can also be stored in a computer connected to the image processing apparatus 10 via a network, such as the Internet, and downloaded via the network.

Figure 5:
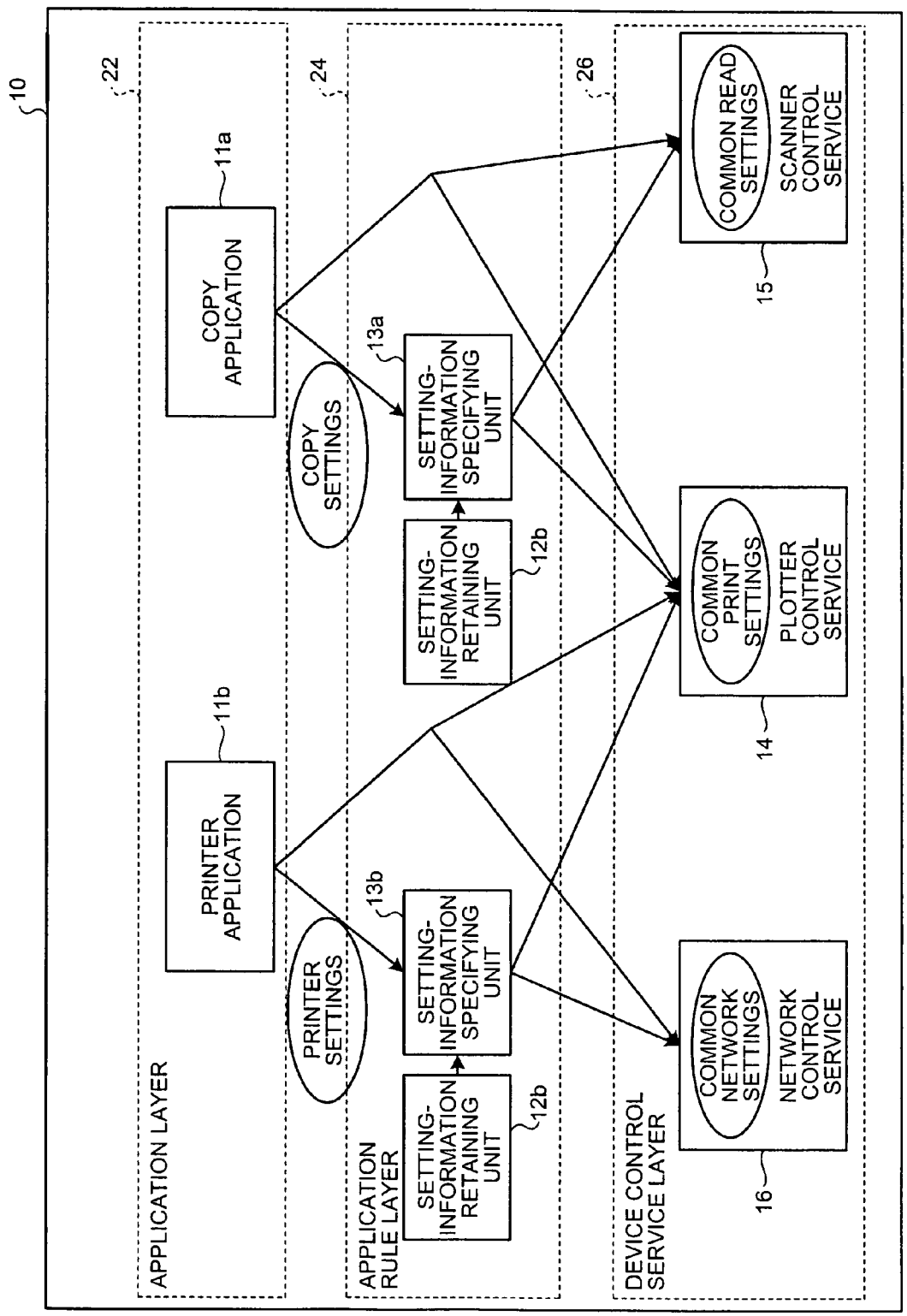
FIG. 5 is a block diagram of a modification of the image processing apparatus.
Figure 6:
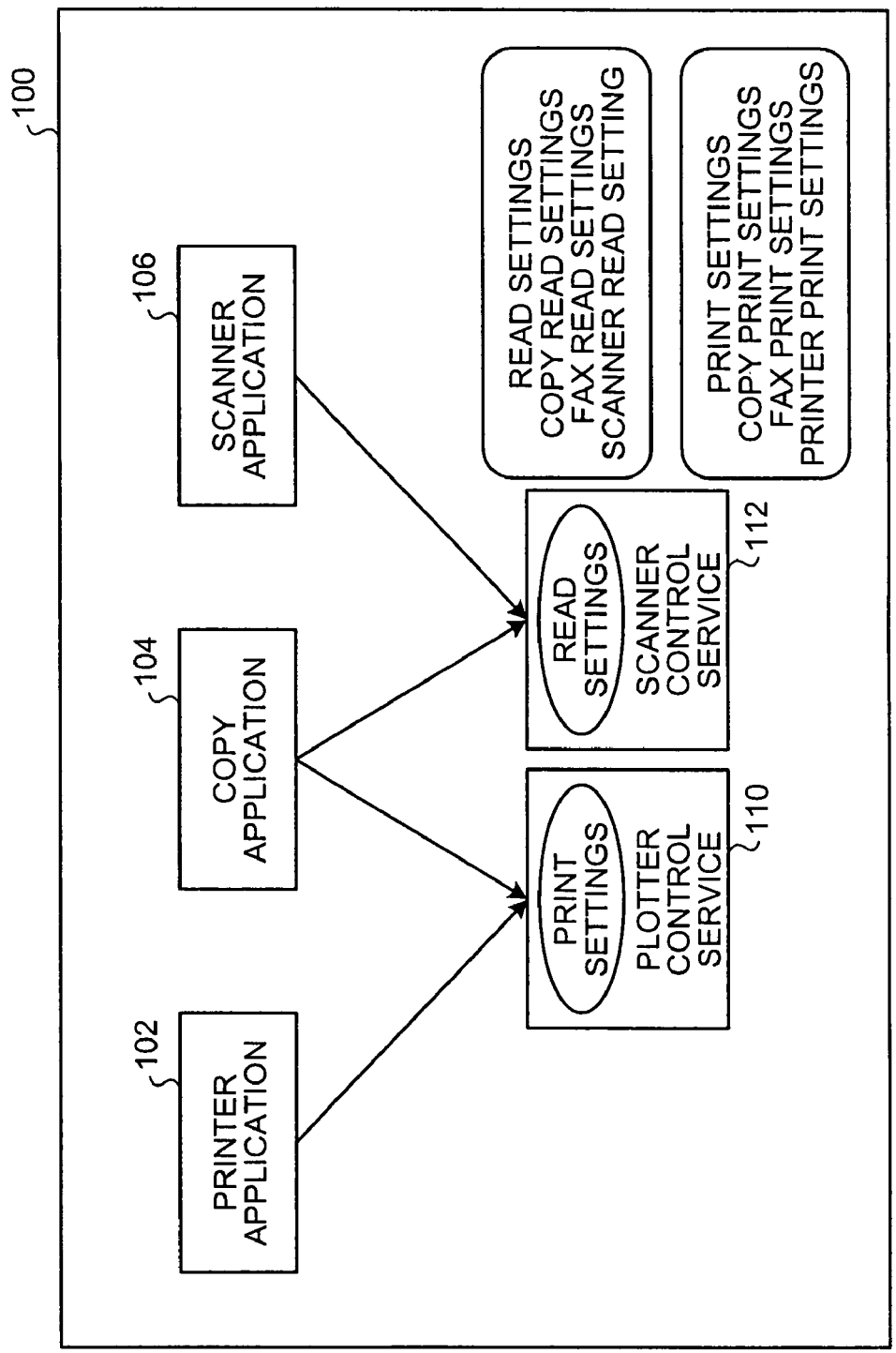
FIG. 6 is a schematic diagram of a conventional information processing apparatus in which applications and common services are separated from each other.
Figure 7:
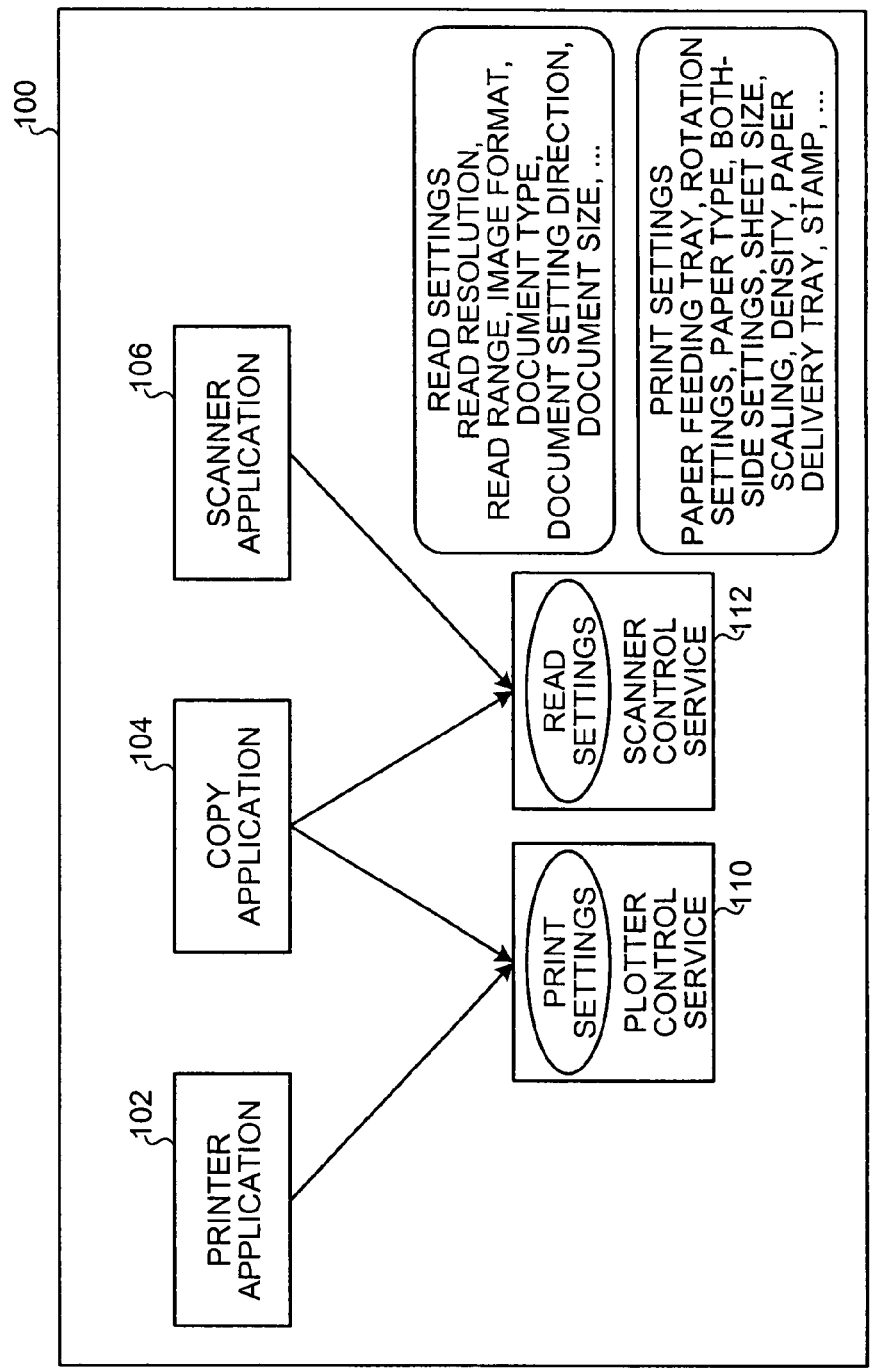
FIG. 7 is examples of parameters.

FIG. 5 is a block diagram of a modification of the image processing apparatus 10. The modification of the image processing apparatus 10 includes a multiple-service setting instruction, i.e., a copy application 11a and a printer application 11b. Also, storage units 12a and 12b and setting-information specifying units 13a and 13b are provided correspondingly to the respective applications. A network control service 16 is further provided as a common service.

In this manner, when a plurality of applications is provided, a plurality of tables for specifying setting information for each application is provided. Therefore, for the same multiple-service setting instruction, pieces of setting information with different applications can be sent.

For example, it is assumed that a function of the copy application 11a is changed. In this case, all what is required is to change the storage unit 12b provided correspondingly to the copy application 11a. The other applications and services are not affected. In this manner, even if a parameter of a certain application is corrected, the other applications are not affected. Therefore, the quality of the software can be maintained high.

While the embodiment is explained with the image processing apparatus 10 as a target apparatus, the target apparatus can be an information processing apparatus that performs processes other than image processing. Besides, the setting-information specifying unit 13 and the storage unit 12 belonging to the application rule layer 24 can be provided between the applications and the common services to loosen the relation between each application and service, so that maintainability and reusability of the system can be improved.

According to an embodiment of the present invention, maintainability and reusability of a system can be improved. Moreover, an appropriate service and setting information can be automatically specified.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a service storage unit that stores therein a plurality of services for controlling settings of a plurality of devices that performs functions related to image processing, each of the plurality of services being software belonging to a device control service layer in a layered architecture of the image processing apparatus;
   an application storage unit that stores therein an application that is software belonging to an application layer in the layered architecture and generates instruction information indicating an instruction related to at least one of the functions, the indicated instruction being one of a single-service setting instruction and a multiple-service setting instruction;
   a setting information specifying unit that belongs to an intervening layer which intervenes between the application layer and the device control service layer in the layered architecture, the setting information specifying unit being configured such that, if the indicated instruction is a multiple-service setting instruction, the setting information specifying unit specifies a service corresponding to the indicated instruction based on the instruction information, and specifies setting information to be set for the service by referring to a table in which the a correspondence between the setting information generated by the application and the plurality of services is defined; and
   a setting unit that sets the setting information for the service specified by the setting information specifying unit, wherein, the image processing apparatus is configured such that when the instruction information indicates the multiple-service setting instruction, the multiple-service setting instruction is sent to the setting information specifying unit, and when the instruction information indicates the single-service setting instruction, the single-service setting instruction is sent to a directly corresponding common service.

2. The image processing apparatus according to claim 1, wherein
the service storage unit stores therein the services each associated with instruction information and setting information to be set for the service, and
the setting information specifying unit specifies the service and the setting information associated with the instruction information.

3. The image processing apparatus according to claim 1, wherein
the application specifies whether the indicated instruction is related to a plurality of functions, and
the application sends, when the indicated instruction is related to a plurality of functions, the instruction information to the setting information specifying unit.

4. The image processing apparatus according to claim 3, wherein, when the indicated instruction is related to a function, the application sends the instruction information to a service corresponding to the function.

5. An information processing apparatus comprising:
a service storage unit that stores therein a plurality of services for controlling settings of a plurality of devices that performs functions related to predetermined processing, each of the plurality of services being software belonging to a device control service layer in a layered architecture of the image processing apparatus;
an application storage unit that stores therein an application that is software belonging to an application layer in the layered architecture and generates instruction information indicating an instruction related to at least one of the functions, the indicated instruction being one of a single-service setting instruction and a multiple-service setting instruction;
a setting information specifying unit that belongs to an intervening layer which intervenes between the application layer and the device control service layer in the layered architecture, the setting information specifying unit being configured such that, if the indicated instruction is a multiple-service setting instruction, the setting information specifying unit specifies a service corresponding to the indicated instruction based on the instruction information, and specifies setting information to be set for the service by referring to a table in which the a correspondence between the setting information generated by the application and the plurality of services is defined; and
a setting unit that sets the setting information to the service specified by the setting information specifying unit,
wherein, the information processing apparatus is configured such that when the instruction information indicates the multiple-service setting instruction, the multiple-service setting instruction is sent to the setting information specifying unit, and when the instruction information indicates the single-service setting instruction, the single-service setting instruction is sent to a directly corresponding common service.

6. The information processing apparatus according to claim 5, wherein the service storage unit stores therein the services each associated with instruction information and setting information to be set for the service, and
the setting information specifying unit specifies the service and the setting information associated with the instruction information.

7. The information processing apparatus according to claim 5, wherein
the application specifies whether the indicated instruction is related to a plurality of functions, and
the application sends, when the indicated instruction is related to a plurality of functions, the instruction information to the setting information specifying unit.

8. The information processing apparatus according to claim 7, wherein, when the indicated instruction is related to a function, the application sends the instruction information to a service corresponding to the function.

9. An image processing method comprising:
generating, from an application that is software belonging to an application layer in a layered architecture, instruction information indicating an instruction related to at least one function, the indicated instruction being one of a single-service setting instruction and a multiple-service setting instruction;
using a setting information specifying unit that belongs to an intervening layer which intervenes between the application layer and a device control service layer in the layered architecture, the setting information specifying unit being configured such that, if the indicated instruction is a multiple-service setting instruction, the setting information specifying unit specifies, based on the instruction information, a service corresponding to the indicated instruction from a plurality of services for controlling settings of a plurality of devices that performs functions related to image processing, and the setting information specifying unit specifies setting information to be set for specified service by referring to a table in which the a correspondence between the setting information generated by the application and the plurality of services is defined, each of the plurality of services being software belonging to the device control service layer in a layered architecture of the image processing apparatus; and
setting the setting information for the service specified by the setting information specifying unit,
wherein, when the instruction information indicates the multiple-service setting instruction, the multiple-service setting instruction is sent to the setting information specifying unit, and when the instruction information indicates the single-service setting instruction, the single-service setting instruction is sent to a directly corresponding common service.

10. The image processing method according to claim 9, wherein
the services are each associated with instruction information and setting information to be set for the service, and
the specifying includes specifying the service and the setting information associated with the instruction information.

11. The image processing method according to claim 9, wherein the generating includes specifying whether the indicated instruction is related to a plurality of functions, and, when the indicated instruction is related to a plurality of functions, issuing the instruction information to the setting information specifying unit.

12. The image processing method according to claim 11, wherein the generating includes issuing, when the indicated instruction is related to a function, the instruction information to a service corresponding to the function.

13. A computer program product comprising a non-transitory computer usable medium having computer readable program codes embodied in the medium that, when executed, cause a computer to implement the image processing method according to claim 9.

14. An information processing method comprising:
generating, from an application that is software belonging to an application layer in a layered architecture, instruction information indicating an instruction related to at least one function, the indicated instruction being one of a single-service setting instruction and a multiple-service setting instruction;
using a setting information specifying unit that belongs to an intervening layer which intervenes between the application layer and a device control service layer in the layered architecture, the setting information specifying unit being configured such that, if the indicated instruction is a multiple-service setting instruction, the setting information specifying unit specifies, based on the instruction information, a service corresponding to the instruction from a plurality of services for controlling settings of a plurality of devices that performs functions related to image processing, and the setting information specifying unit specifies setting information to be set for specified service by referring to a table in which a correspondence between the setting information generated by the application and the plurality of services is defined, each of the plurality of services being software belonging to the device control service layer in a layered architecture of the image processing apparatus; and
setting the setting information for the service specified by the setting information specifying unit,
wherein, when the instruction information indicates the multiple-service setting instruction, the multiple-service setting instruction is sent to the setting information specifying unit, and when the instruction information indicates the single-service setting instruction, the single-service setting instruction is sent to a directly corresponding common service.

15. The information processing method according to claim 14, wherein
the services are each associated with instruction information and setting information to be set for the service, and
the specifying includes specifying the service and the setting information associated with the instruction information.

16. The information processing method according to claim 14, wherein the generating includes specifying whether the indicated instruction is related to a plurality of functions, and, when the instruction is related to a plurality of functions, issuing the instruction information to the setting information specifying unit.

17. The information processing method according to claim 16, wherein the generating includes issuing, when the indicated instruction is related to a function, the instruction information to a service corresponding to the function.

18. A computer program product comprising a non-transitory computer usable medium having computer readable program codes embodied in the medium that, when executed, cause a computer to implement the information processing method according to claim 14.

* * * * *